(12) United States Patent
Saito

(10) Patent No.: US 9,329,455 B2
(45) Date of Patent: May 3, 2016

(54) LIGHT FLUX CONTROLLING MEMBER, LIGHT EMITTING DEVICE AND ILLUMINATION APPARATUS

(71) Applicant: Enplas Corporation, Saitama (JP)

(72) Inventor: Tomohiro Saito, Saitama (JP)

(73) Assignee: Enplas Corporation, Saitama (JP)

( * ) Notice: Subject to any disclaimer, the term of this patent is extended or adjusted under 35 U.S.C. 154(b) by 114 days.

(21) Appl. No.: 14/226,863

(22) Filed: Mar. 27, 2014

(65) Prior Publication Data

US 2014/0293613 A1    Oct. 2, 2014

(30) Foreign Application Priority Data

Mar. 28, 2013  (JP) ................. 2013-068657
Jun. 19, 2013  (JP) ................. 2013-128423

(51) Int. Cl.
*F21V 5/00*      (2015.01)
*G03B 15/05*     (2006.01)
*G02B 19/00*     (2006.01)

(52) U.S. Cl.
CPC ............ *G03B 15/05* (2013.01); *G02B 19/0028* (2013.01); *G02B 19/0061* (2013.01); *G03B 2215/0567* (2013.01); *G03B 2215/0592* (2013.01)

(58) Field of Classification Search
CPC ........... G03B 15/05; G03B 2215/0567; G03B 2215/0592; G02B 19/0028; G02B 19/0061
See application file for complete search history.

(56) References Cited

U.S. PATENT DOCUMENTS 3,502,865 A * 3/1970 Matteson ................. F21V 5/02
                                                    362/309
2011/0286221 A1* 11/2011 Saito ....................... F21V 5/045
                                                    362/311.06

FOREIGN PATENT DOCUMENTS

JP        2011-192494 A     9/2011

* cited by examiner

*Primary Examiner* — Thomas M Sember
(74) *Attorney, Agent, or Firm* — Brundidge & Stanger, P.C.

(57) ABSTRACT

A light flux controlling member has an incidence region and an emission region. The incidence region is assumed to have a plurality of virtual quadrangles that are disposed in such a manner that one fits into another, and have the same number of apexes as one another, and includes a plurality of convex parts each of which has a ridge line along a first virtual straight line that connects two adjacent apexes of the virtual quadrangle, and a plurality of wall portions each of which is disposed along a second virtual straight line that connects respective corresponding apexes of the virtual quadrangles. The wall portion is disposed continuously between a connection portion of the convex parts at an innermost side and a connection portion of the convex parts at an outermost side in the second virtual straight line.

7 Claims, 18 Drawing Sheets

PRIOR ART

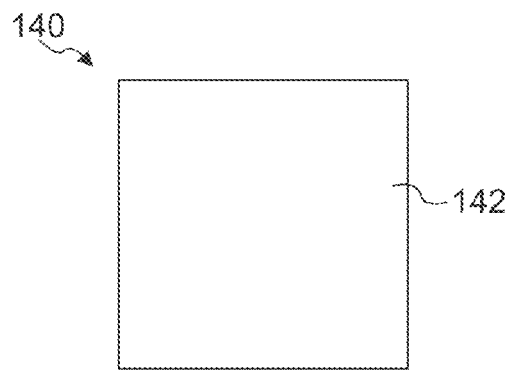
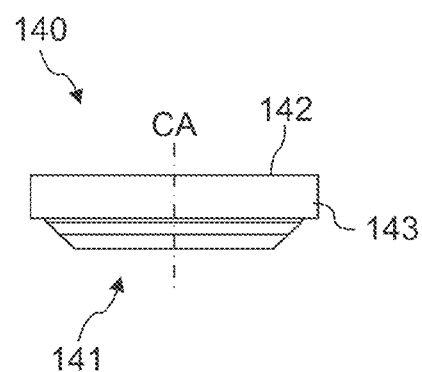
FIG. 4A        FIG. 4B
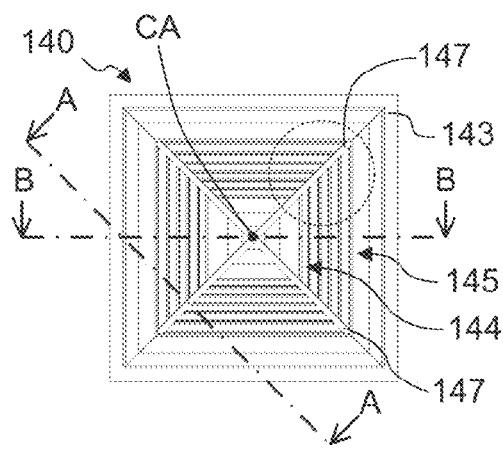
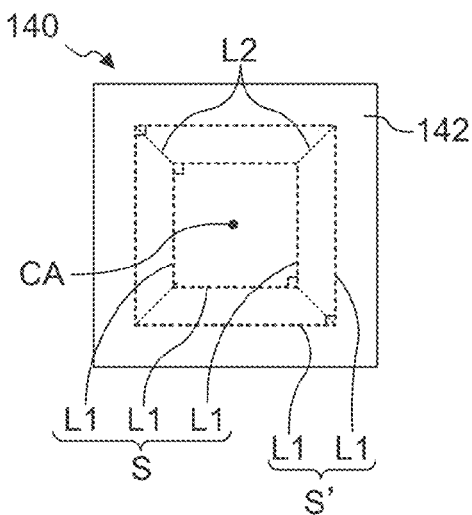
FIG. 4C        FIG. 4D

LIGHT FLUX CONTROLLING MEMBER, LIGHT EMITTING DEVICE AND ILLUMINATION APPARATUS

CROSS REFERENCE TO RELATED APPLICATIONS

This application is entitled to and claims the benefit of Japanese Patent Application No. 2013-068657, filed on Mar. 28, 2013, and Japanese Patent Application No. 2013-128423, filed on Jun. 19, 2013, the disclosure of which including the specification, drawings and abstract is incorporated herein by reference in their entirety.

TECHNICAL FIELD

The present invention relates to a light flux controlling member that controls distribution of light that is emitted from a light emitting element, a light emitting device and an illumination apparatus that have the light flux controlling member.

BACKGROUND ART

In recent years, from the viewpoint of energy conservation and miniaturization, light emitting devices (LED flashes) adopting light-emitting diodes (hereinafter, also called "LED") as the light sources have been used as the light emitting devices for imaging cameras. As the light emitting devices described above, a light emitting device in which an LED and a Fresnel lens are combined is well known (see PTL 1, for example).

FIG. 1A is a sectional view of the light emitting device described in PTL 1. As illustrated in FIG. 1A, light emitting device 10 described in PTL 1 has substrate 20, light source substrate 21, light source 30 including a light emitting element and phosphors, and Fresnel lens 40. Fresnel lens 40 is disposed on substrate 20 to face a light emission surface of light source 30.

FIG. 1B is a sectional view of Fresnel lens 40. As illustrated in FIG. 1B, on one surface of Fresnel lens 40, refraction Fresnel lens section 41 and reflection Fresnel lens section 42 are formed. Refraction Fresnel lens section 41 and reflection Fresnel lens section 42 each have a plurality of tonic protrusions that are disposed in concentric circular shapes. Refraction Fresnel lens section 41 is formed in a position facing light source 30. Reflection Fresnel lens section 42 is formed around refraction Fresnel lens section 41 in such a manner as to surround light source 30. In Fresnel lens 40, a surface on which refraction Fresnel lens section 41 and reflection Fresnel lens section 42 are formed functions as incidence region 43, and a surface opposite to incidence region 43 functions as emission region 44.

In light emitting device 10 illustrated in FIG. 1A, light that is emitted from light source 30 at a small angle with respect to an optical axis is refracted in a predetermined direction in refraction Fresnel lens section 41, and is emitted from emission region 44. Light that is emitted from light source 30 at a large angle with respect to the optical axis is incident on incidence surface 45 of reflection Fresnel lens section 42, is reflected in a predetermined direction at reflection surface 46, and is emitted from emission region 44. In this manner, light emitting device 10 described in PTL 1 controls distribution of the light that is emitted from light source 30 by using Fresnel lens 40 that has refraction Fresnel lens section 41 and reflection Fresnel lens section 42.

CITATION LIST

Patent Literature

PTL 1
Japanese Patent Application Laid-Open No. 2011-192494

SUMMARY OF INVENTION

Technical Problem

In general, the shapes of the imaging regions of imaging cameras are quadrangular. Therefore, in order to obtain a clear captured image, the light emitting device preferably illuminates a region to be irradiated in a quadrangular shape. However, when a quadrangular region to be irradiated is irradiated with light using the Fresnel lens of PTL 1, the four corners of the region to be irradiated are likely to be dark. Further, when the four corners of the region to be irradiated are to be sufficiently irradiated with light, useless light is generated, since the light needs to be expanded. Thus, in the case of using the Fresnel lens of PTL 1, the light emitted from the light emitting element cannot be uniformly and efficiently radiated onto a quadrangular region to be irradiated. Similar problem arises not only when the shape of the region to be irradiated is a quadrangular but also when the shape is a polygon, such as a hexagon.

An object of the present invention is to provide a light flux controlling member capable of uniformly and efficiently radiating light that is emitted from a light emitting element onto regions to be irradiated in shapes other than circularly symmetric shapes, such as polygons. Further, an object of the present invention is to provide a light emitting device and an illumination apparatus that have the light flux controlling member.

Solution to Problem

In order to attain at least one of the above mentioned objects, a light flux controlling member of the present invention is a light flux controlling member that controls distribution of light that is emitted from a light emitting element, and has an incidence region that allows the light that is emitted from the light emitting element to be incident thereon, and an emission region that emits light that is incident on the incidence region, in which the incidence region includes n wall portions that are provided to extend to a central portion from respective n apexes of a virtual n-sided polygonal shape, and a plurality of convex parts each of which has a ridge line that connects two of the wall portions adjacent to each other, the plurality of convex parts are each disposed in such a manner that a valley portion is formed between two of the convex parts adjacent to each other, and the wall portion is disposed continuously at least between a connection portion of the convex parts located at an innermost side and a connection portion of the convex parts located at an outermost side.

A light emitting device of the present invention has a light emitting element, and the light flux controlling member of the present invention.

An illumination apparatus of the present invention has the light emitting device of the present invention, and a cover that transmits emitted light from the light emitting device while diffusing the emitted light.

Advantageous Effects of Invention

The light emitting device having the light flux controlling member of the present invention can uniformly and efficiently radiate light that is emitted from the light emitting element onto the region to be irradiated in a shape other than circularly symmetric shapes, such as a polygonal shape. Further, the illumination apparatus of the present invention can uniformly and efficiently illuminate the region to be irradiated in a shape other than circularly symmetric shapes, such as a polygonal shape.

BRIEF DESCRIPTION OF DRAWINGS

FIGS. 4A to 4D illustrate a configuration of the light flux controlling member according to Embodiment 1;

DESCRIPTION OF EMBODIMENTS

Hereinafter, embodiments of the present invention will be described in detail with reference to the accompanying drawings.

(Embodiment 1)
(Configurations of Light Flux Controlling Member and Light Emitting Device)

Figure 1A:
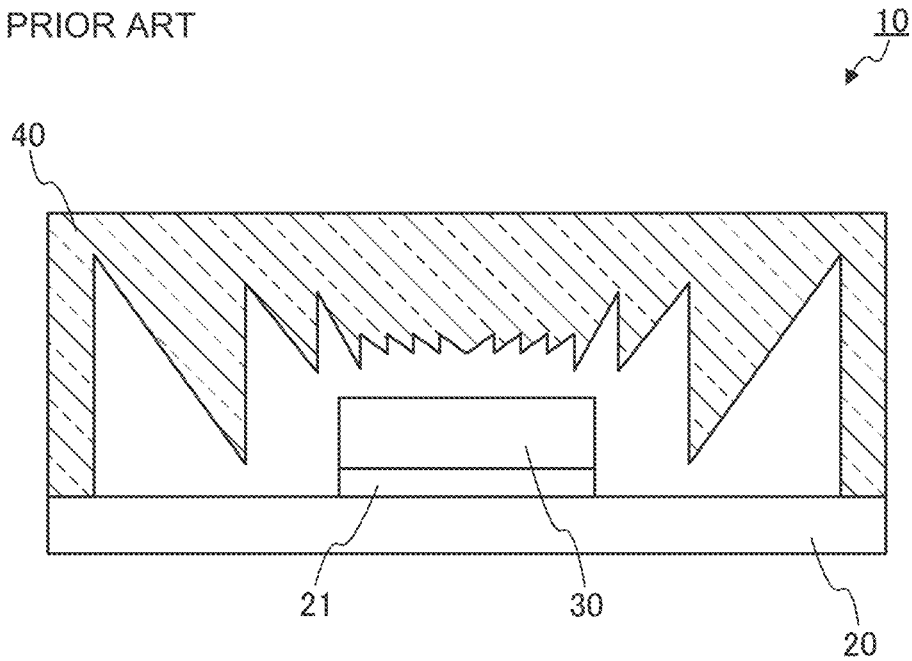
FIGS. 1A and 1B illustrate a configuration of a light emitting device described in PTL 1.
Figure 1B:
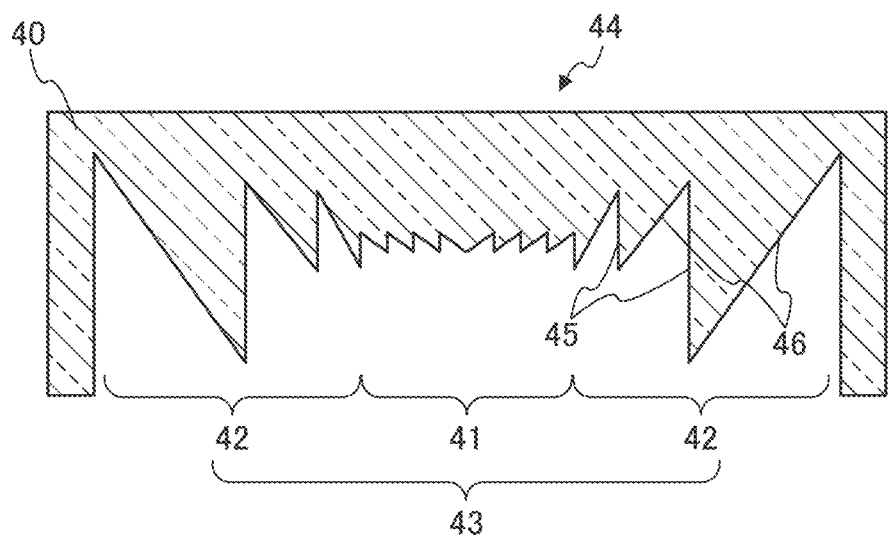
Figure 2:
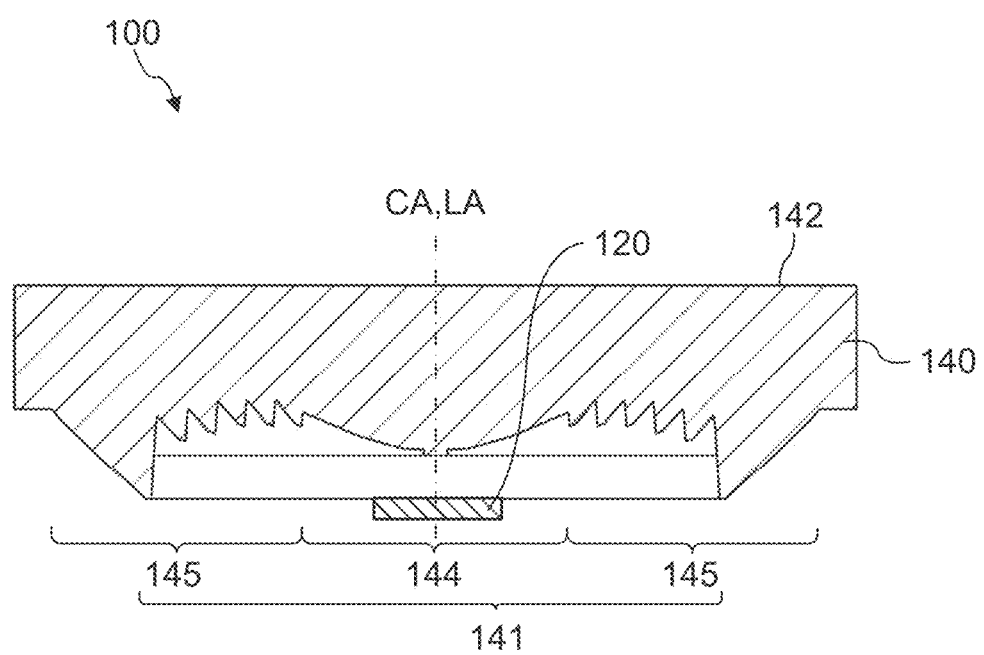
FIG. 2 is a sectional view of a light emitting device according to Embodiment 1.

FIG. 2 is a sectional view of light emitting device 100 according to Embodiment 1. As illustrated in FIG. 2, light emitting device 100 has light emitting element 120 and light flux controlling member 140. Light emitting element 120 is, for example, a light-emitting diode (LED) such as a white light-emitting diode. Light flux controlling member 140 controls distribution of light that is emitted from light emitting element 120. Central axis CA of light flux controlling member 140 is disposed to coincide with optical axis LA of light emitting element 120.

Light flux controlling member 140 can be formed by injection molding. The material of light flux controlling member 140 is not particularly limited as long as the material can transmit light of a desired wavelength. For example, the material of light flux controlling member 140 is an optically transparent resin such as polymethyl methacrylate (PMMA), polycarbonate (PC), and epoxy resin (EP), or glass.

Figure 3:
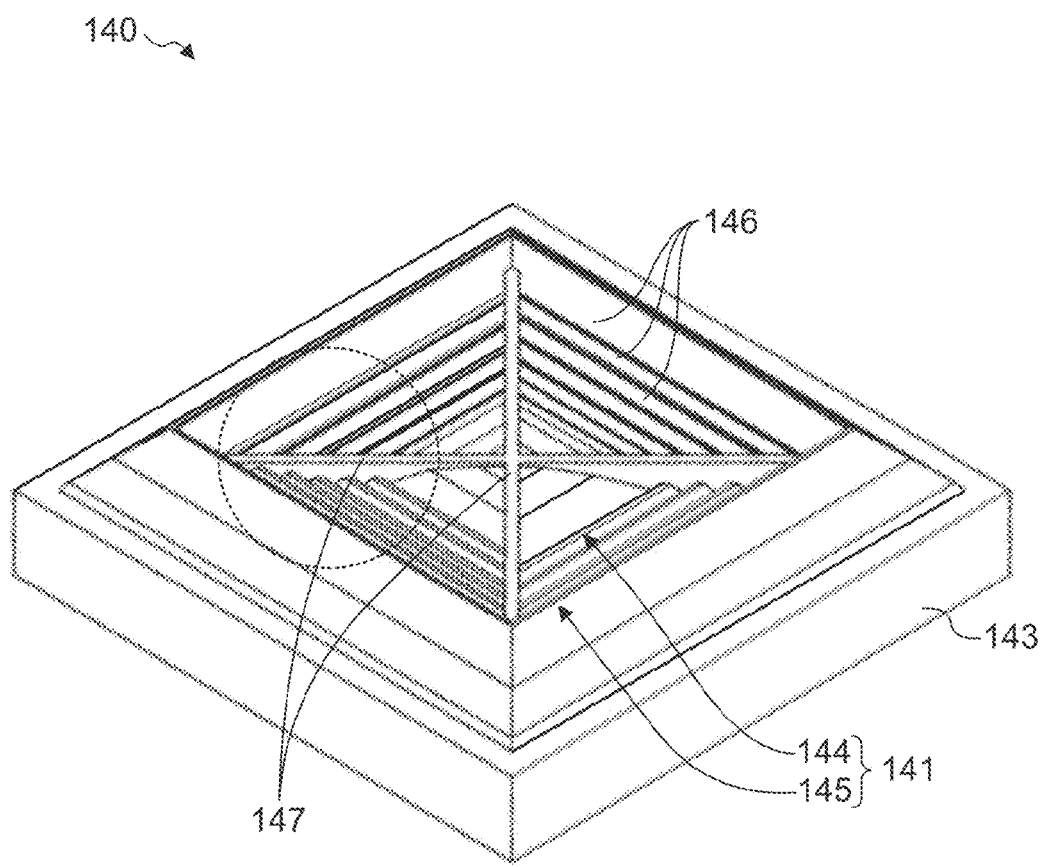
FIG. 3 is a perspective view of a light flux controlling member according to Embodiment 1.
Figure 5:
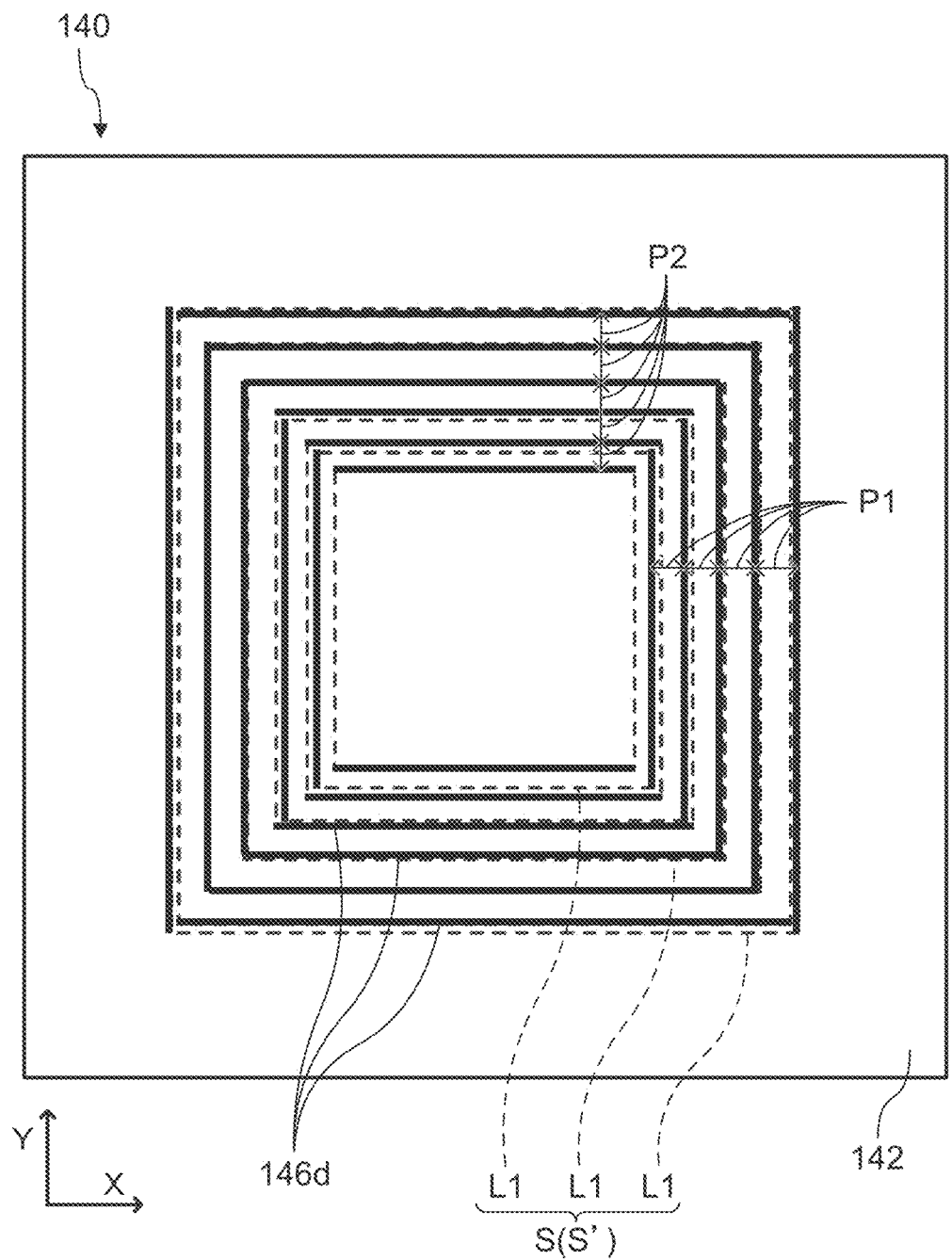
FIG. 5 is a bottom view of the light flux controlling member according to Embodiment 1 that schematically illustrates only ridge lines of convex parts.
Figure 6A:
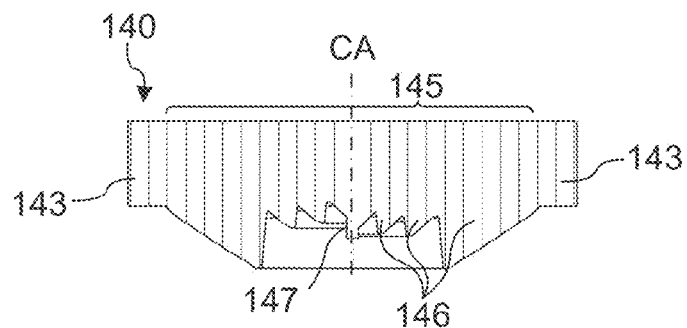
FIGS. 6A to 6C are sectional views of the light flux controlling member according to Embodiment 1.
Figure 6B:
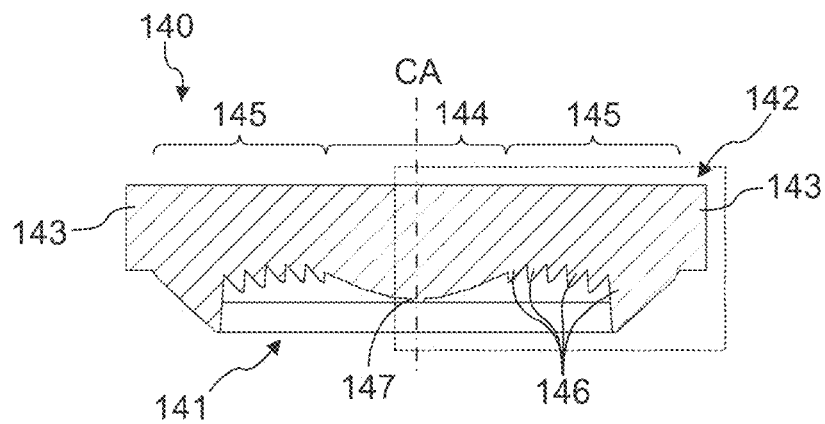
Figure 6C:
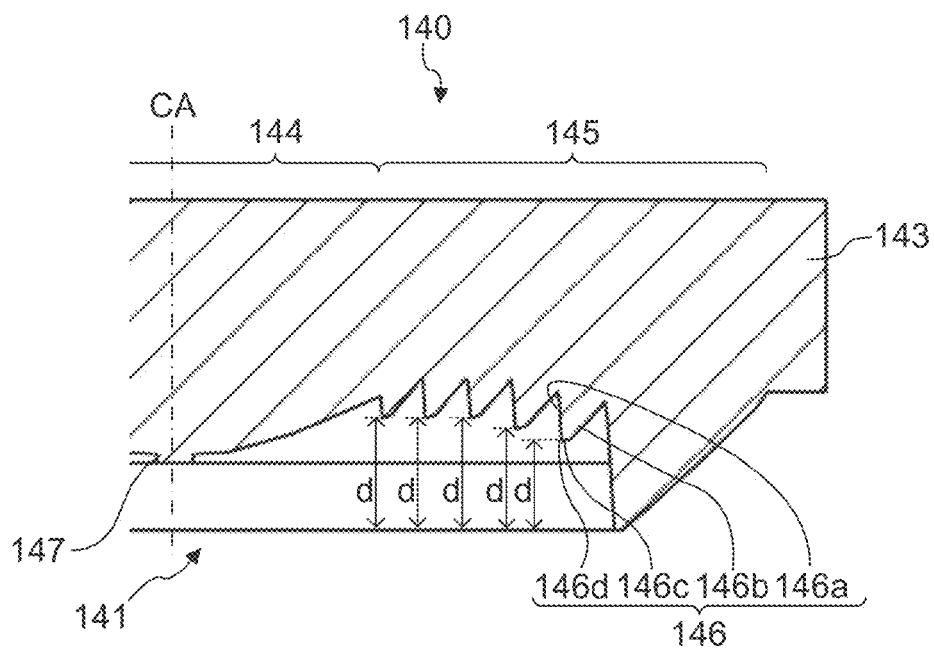
Figure 7A:
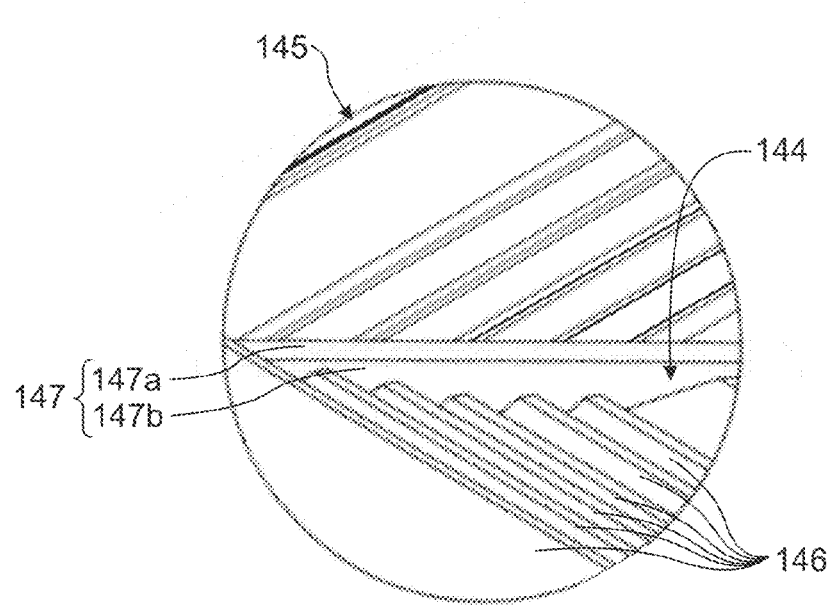
FIGS. 7A and 7B are partially enlarged views of the light flux controlling member according to Embodiment 1.
Figure 7B:
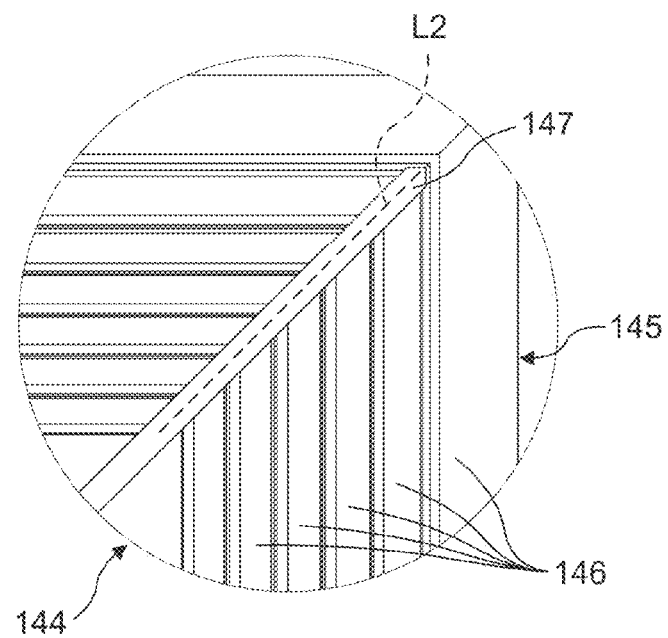

FIGS. 3 to 7B illustrate a configuration of light flux controlling member 140 according to Embodiment 1. FIG. 3 is a perspective view of light flux controlling member 140. FIG. 4A is a plan view of light flux controlling member 140, FIG. 4B is a side view thereof, and FIG. 4C is a bottom view thereof. FIG. 4D is a bottom view in which recesses and protrusions are omitted. FIG. 5 is a bottom view schematically illustrating only ridge lines 146d (that will be described later) of convex parts 146. FIG. 6A is a sectional view taken along the line A-A illustrated in FIG. 4C. FIG. 6B is a sectional view taken along the line B-B. FIG. 6C is an enlarged view of the portion indicated by the broken line illustrated in FIG. 6B. FIG. 7A is an enlarged view of the portion indicated by the broken line illustrated in FIG. 3. FIG. 7B is an enlarged view of the portion indicated by the broken line illustrated in FIG. 4C.

As illustrated in FIGS. 3 to 7B, light flux controlling member 140 has incidence region 141 that allows light that is emitted from light emitting element 120 to be incident thereon, and emission region 142 that is located opposite to incidence region 141, and emits the light that is incident on incidence region 141. Flange 143 may be provided between incidence region 141 and emission region 142.

An external shape in plan view of incidence region 141 of light flux controlling member 140 is a polygon, and is properly specified in accordance with the shape of a region to be irradiated. In the present embodiment, an external shape of light flux controlling member 140 is a quadrangle (more specifically, a square) when light flux controlling member 140 including incidence region 141 and flange 143 is seen in plan view (see FIG. 4A).

Incidence region 141 allows light that is emitted from light emitting element 120 to be incident thereon. Incidence region 141 has refraction section 144 that is located in a central portion, and Fresnel lens section 145 that is located outside refraction section 144 (see FIG. 2).

Refraction section 144 allows a part of the light that is emitted from light emitting element 120 (light emitted at a small angle with respect to optical axis LA) to be incident into light flux controlling member 140, and refracts the incident light to emission region 142. Refraction section 144 is disposed at a position that faces light emitting element 120 to intersect central axis CA of light flux controlling member 140 (optical axis LA of light emitting element 120) (see FIG. 2). Note that the shape of refraction section 144 is not particularly limited as long as refraction section 144 can exhibit the above described function. For example, the shape of refraction section 144 may be the shape of a refraction Fresnel lens. A surface of refraction section 144 may be a spherical surface or an aspherical surface. In the present embodiment, the surface of refraction section 144 is an aspherical surface, and the shape of refraction section 144 is a substantially quadrangular pyramid shape (see FIGS. 3 and 6B).

Fresnel lens section 145 allows a part of the light that is emitted from light emitting element 120 (light that is emitted at a large angle with respect to optical axis LA) into light flux controlling member 140, and reflects the incident light to emission region 142. Fresnel lens section 145 has a plurality of convex parts 146 for controlling the traveling direction of the light that is emitted from light emitting element 120, and a plurality of wall portions 147 that are disposed at opposite ends of the plurality of convex parts 146 (see FIG. 3).

As illustrated in FIGS. 4D and 5, virtual quadrangle (virtual n-sided polygon, where n=4 in the present embodiment) S is assumed to be disposed in plan view in Fresnel lens section 145. Herein, the case of virtual quadrangle S being a four-fold rotationally symmetrical square is described. As used herein, "four-fold rotationally symmetrical" means that when virtual quadrangle S is rotated 90°) (360/4°, the shape of virtual quadrangle S before rotation coincides with the shape of virtual quadrangle S after rotation.

Virtual quadrangle S is the reference on which a plurality of convex parts 146 and a plurality of wall portions 147 are disposed. A plurality of wall portions 147 are provided in such a manner as to extend toward a central portion of virtual quadrangle S from respective apexes (four apexes in the present embodiment) of virtual quadrangle S. A plurality of convex parts 146 are disposed in n regions among wall portions 147 that are adjacent to one another (four regions in the present embodiment) in such a manner as to connect wall portions 147 that are adjacent to one another. In each of the regions among wall portions 147 that are adjacent to one another, a valley portion is formed between two adjacent convex parts 146, and ridge lines 146*d* are parallel with each other. Herein, a side of virtual quadrangle S (a line that connects the two apexes that are adjacent to each other) and straight lines parallel with the side are called "first virtual straight lines L1" (see FIG. 4D). Wall portion 147 is disposed along a line (a line overlapping a diagonal line in the present embodiment) that connects corresponding apexes of a plurality of quadrangles (virtual quadrangle S and virtual quadrangles S' that are geometrically similar to virtual quadrangle S) formed of a plurality of first virtual straight lines L1. Herein, a line that connects corresponding apexes of virtual quadrangle S and a plurality of virtual quadrangles S' that are geometrically similar to virtual quadrangle S is called "second virtual straight line L2" (see FIG. 4D).

As illustrated in FIG. 5, in the present embodiment, convex parts 146 are disposed along each of pairs of first virtual straight lines L1 that face each other in each of virtual quadrangle S and virtual quadrangles S'. Note that the broken lines in FIG. 5 represent first virtual straight lines L1. The thick solid lines represent ridge lines 146*d* of convex parts 146. Further, in FIG. 5, the lateral direction is set as an X-axis direction, and the vertical direction is set as a Y-axis direction.

Further, pitches (intervals) P1 between ridge lines 146*d* of convex parts 146 in the X-axis direction are properly designed in accordance with a length in the X-axis direction of the region to be irradiated. Similarly, pitches P2 between ridge lines 146*d* of convex parts 146 in the Y-axis direction are properly designed in accordance with a length in the Y-axis direction of the region to be irradiated. Namely, a light condensation degree of light flux controlling member 140 is adjusted in accordance with the lengths in the X-axis direction and the Y-axis direction of the region to be irradiated. Further, a light condensation degree in Fresnel lens section 145 is adjusted in accordance with an inclination of an inclining surface that forms convex part 146 that will be described later. Furthermore, heights and the pitches of convex parts 146 are set with a use environment and a manufacturing method of light flux controlling member 140 taken into consideration. In the present embodiment, ridge lines 146*d* that extend in the Y-axis direction are parallel with one another, since pitches P1 among ridge lines 146*d* in the X-axis direction are constant. Similarly, ridge lines 146*d* that extend in the X-axis direction are also parallel with one another, since pitches P2 among ridge lines 146*d* in the Y-axis direction are the same. Further, in the present embodiment, pitch P1 between ridge lines 146*d* of convex parts 146 is larger than pitch P2 between ridge lines 146*d* of convex parts 146. Thereby, a region where ridge lines 146*d* are disposed to have pitches P2 has a higher light condensation degree than a region where ridge lines 146*d* are disposed to have pitches P1.

Shapes and dimensions of convex parts 146 are not particularly limited, and may be different from one another. In the present embodiment, in order to control all the light emitted at a large angle with respect to optical axis LA by light flux controlling member 140, convex part 146 located at an outermost side is formed to be larger than convex parts 146 located at an inner side (central axis CA side). The dimensions of a plurality of convex parts 146 that are located at the inner side are the same (see FIG. 6C). Further, distances d between a lower end portion of light flux controlling member 140 and respective ridge lines 146*d* (distances d from a reference plane to ridge lines 146*d*) in the direction of optical axis LA, become gradually shorter toward an outer side from the inner side (see FIG. 6C).

Convex part 146 has first inclining surface 146*a*, second inclining surface 146*b*, third inclining surface 146*c* and ridge line 146*d*. In convex part 146, first inclining surface 146*a* is disposed at the inner side (central axis CA side), and second inclining surface 146*b* is disposed at the outer side (see FIG. 6C).

First inclining surface 146*a* is an incidence surface that allows the light that is emitted from light emitting element 120 to be incident thereon, and refracts the light to a side of second inclining surface 146*b*. First inclining surface 146*a* may be a straight line or may be a curved line in a cross-section including central axis CA.

Second inclining surface 146*b* is a reflection surface that reflects the light that is incident on first inclining surface 146*a* to emission region 142. Second inclining surface 146*b* may be a straight line or may be a curved line in the cross-section including central axis CA.

An angle of inclining surfaces (first inclining surface 146*a* and second inclining surface 146*b*) that extend in the X-axis direction, and an angle of inclining surfaces (first inclining surface 146*a* and second inclining surface 146*b*) that extend in the Y-axis direction may be different from each other as long as the region in the Y-axis direction and the region in the X-axis direction in the region to be irradiated can be properly illuminated respectively. Note that when first inclining surface 146*a* is a curved line in the cross-section including central axis CA, "the angle of first inclining surface 146*a*" refers to an angle of a tangent of first inclining surface 146*a* in an incidence point of light. Further, when second inclining surface 146*b* is a curved line in the cross-section including central axis CA, "the angle of second inclining surface 146*b*" refers to an angle of a tangent of second inclining surface 146*b* in the incidence point of light.

Third inclining surface 146*c* is a surface that connects first inclining surface 146*a* and second inclining surface 146*b*. Third inclining surface 146*c* may be a straight line or may be a curved line in the cross-section including central axis CA. Further, instead of forming third inclining surface 146*c*, first inclining surface 146*a* and second inclining surface 146*b* may be directly connected. Note that when third inclining surface 146*c* is a curved line in the cross-section including central axis CA, "the angle of third inclining surface 146*c*" refers to an angle of a tangent of third inclining surface 146*c* in the incidence point of light.

Ridge line 146*d* is a boundary line of first inclining surface 146*a* and third inclining surface 146*c*, or second inclining surface 146*b* and third inclining surface 146*c*. When third inclining surface 146*e* is not fog red, ridge line 146*d* is a boundary line of first inclining surface 146*a* and second inclining surface 146*b*. In the present embodiment, ridge line 146*d* is a boundary line of first inclining surface 146*a* and third inclining surface 146*c*. Thus when third inclining surface 146*c* is provided between first inclining surface 146*a* and second inclining surface 146*b*, an acute angle portion is eliminated, and thereby, manufacturability can be enhanced.

Figure 8A:
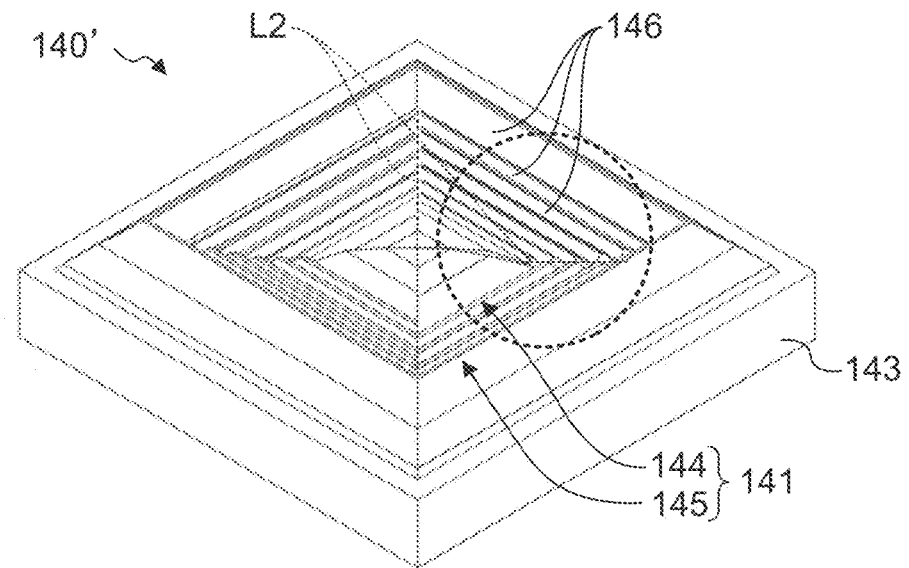
FIGS. 8A and 8B illustrate a configuration of a light flux controlling member that does not have a wall portion.
Figure 8B:
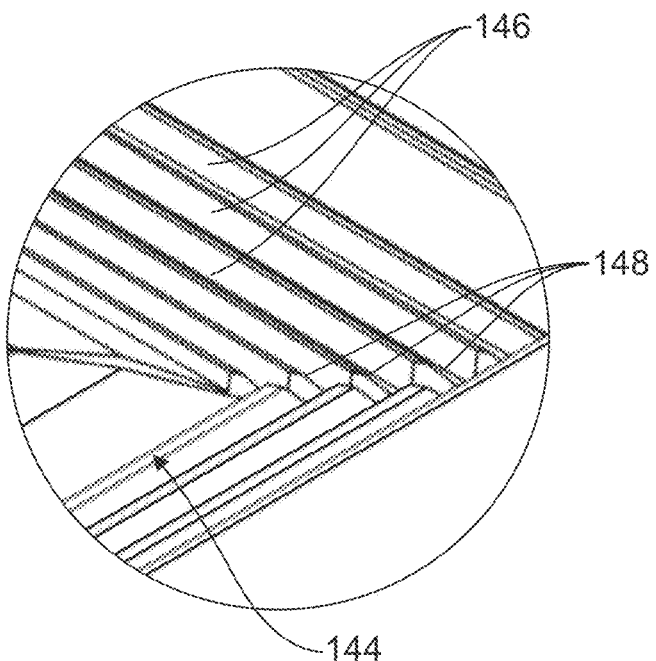

As illustrated in FIGS. 4C, 4D, 7A, and 7B, wall portions 147 are disposed on second virtual straight lines L2 (the diagonal lines of virtual quadrangle S) and at opposite ends of convex parts 146. With reference to FIGS. 4A to 4D, 7A, 7B, 8A, and 8B, a configuration and an effect of wall portion 147 will be described. FIGS. 8A and 8B illustrate a configuration of light flux controlling member 140' that does not have wall portion 147. FIG. 8A is a perspective view of light flux controlling member 140' that does not have wall portion 147, and FIG. 8B is an enlarged view of a portion indicated by the broken line illustrated in FIG. 8A.

As illustrated in FIGS. 8A and 8B, when regions at both sides of second virtual straight line L2 are compared, in light flux controlling member 140' in which the heights of convex parts 146 and/or pitches among ridge lines 146d of convex part 146 differ from one another, displacements occur among convex parts 146 on second virtual straight line L2, and edge portions 148 are produced. Further, when the shapes of convex parts 146 differ at both sides of second virtual straight line L2, displacements occur among convex parts 146 on second virtual straight line L2, and edge portions 148 are also produced.

When light flux controlling member 140' as described above is framed by injection molding, bubbles remain in portions of a molding die corresponding to edge portions 148 (opposite end portions of convex parts 146), and molten resin is unlikely to be sufficiently loaded into a cavity. Further, even when the molten resin is sufficiently loaded into the portions of the molding die corresponding to edge portions 148 (opposite end portions of convex parts 146), and light flux controlling member 140' is properly molded, there is a risk of edge portions 148 being broken by contacting the other components. When such "breakage of the edge portions (opposite end portions of the convex parts)" occurs, light flux controlling member 140' is highly unlikely to exhibit desired light distribution characteristics. Further, in illumination apparatus 400 or the like, which will be described later, that has such light flux controlling member 140', a broken piece of edge portion 148 (convex part 146) adheres to a light emission surface of light emitting element 120, and uniform illuminance distribution is unlikely to be obtained.

In contrast, in light flux controlling member 140 according to the present embodiment, in order to solve all the problems as described above, wall portion 147 is disposed on second virtual straight line L2 as illustrated in FIGS. 7A and 7B. Wall portion 147 is formed by injection molding, and a site that corresponds to wall portion 147 at the time of injection molding functions as a degassing passage.

As illustrated in FIG. 7A, wall portion 147 has apex 147a and side surface portion 147b. To wall portion 147, convex parts 146 are respectively connected from both sides with second virtual straight line L2 therebetween. Ridge line 146d of convex part 146 is connected to apex 147a of wall portion 147 or side surface portion 147b of wall portion 147. Namely, the height of wall portion 147 is designed to be equal to, or larger than the height of convex part 146, at least in a portion where convex part 146 is connected. Therefore, in light flux controlling member 140 of the present invention, both the end portions of convex part 146 are protected by wall portion 147, and therefore, edge portion 148 is not produced. Accordingly, in light flux controlling member 140 according to the present embodiment, both the end portions of convex parts 146 will not be broken, and desired light distribution characteristics can be obtained.

Note that wall portion 147 may be formed to be lower than convex part 146 in a portion where convex part 146 is not connected. A sectional shape of wall portion 147 in a cross-section orthogonal to second virtual straight line L2 is not particularly limited, and is, for example, a vertically-oriented rectangle (see FIGS. 6A to 6C) or a triangle.

Wall portion 147 is disposed continuously at least between a connection portion of convex parts 146 that are located at an innermost side, and a connection portion of convex parts 146 that are located at the outermost side, on second virtual straight line L2. Consequently, at the time of injection molding, the site of the molding die where wall portion 147 should be formed functions as a degassing passage, and therefore, the molten resin is properly loaded into the cavity.

Note that a position at an inner side end portion of wall portion 147 in a direction of second virtual straight line L2 is not particularly limited as long as the above described function can be exhibited. In the present embodiment, wall portion 147 extends to the center of light flux controlling member 140, and is connected to other wall portions 147 in the center (see FIG. 4C).

Emission region 142 is a surface that is formed at a side of a region to be irradiated, that is an opposite side from light emitting element 120. Emission region 142 is formed to intersect central axis CA of light flux controlling member 140 (see FIG. 4B). Emission region 142 emits light that is incident on refraction section 144, and light that is incident on first inclining surface 146a of Fresnel lens section 145 and is reflected on second inclining surface 146b to the region to be irradiated. The shape of emission region 142 is not particularly limited as long as emission region 142 can reduce illuminance unevenness on a surface to be irradiated without breaking the external shape of the region to be irradiated. Emission region 142 may be a flat surface, or may be a roughened surface. Surface roughness of roughened emission region 142 can be defined by ten point mean height of irregularities $Rz_{JIS}$, arithmetic mean irregularities Ra, maximum height of irregularities Ry (all of them are roughness parameters defined in JIS B 0601:2013), and the like. For example, ten point mean height of irregularities $Rz_{JIS}$ of emission region 142 of such a degree that does not break the external shape of the region to be irradiated is preferably 3 μm or less, and is preferably 1 μm or less in order to obtain a proper diffusion effect.

(Illuminance Simulation)

For light emitting device 100 having light flux controlling member 140 according to Embodiment 1 having wall portions 147, simulation of illuminance distribution was performed. Further, for comparison, simulation of illuminance distribution was performed for a light emitting device having light flux controlling member 140' that does not have a wall portion and is illustrated in FIGS. 8A and 8B.

Figure 9A:
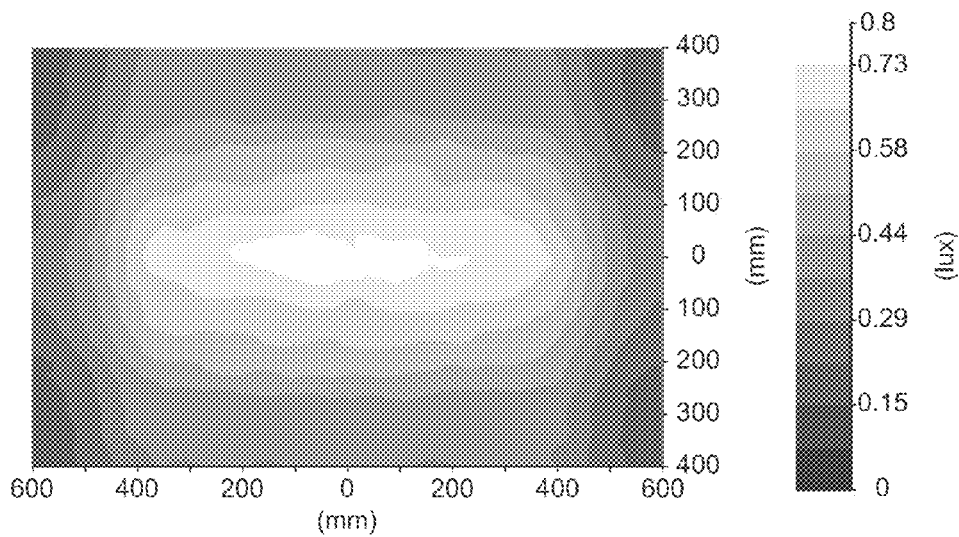
FIGS. 9A and 9B are diagrams illustrating simulations of illuminance distribution.
Figure 9B:
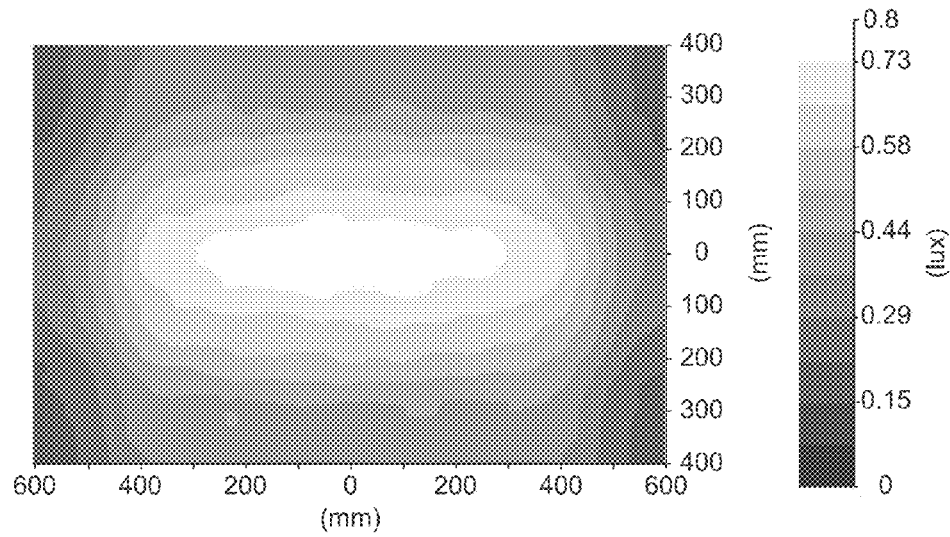

FIG. 9A is a diagram illustrating a simulation of the illuminance distribution using light emitting device 100 according to the present embodiment, and FIG. 9B is a diagram illustrating a simulation of the illuminance distribution using a comparative light emitting device. FIGS. 9A and 9B illustrate the simulations of the illuminance distribution in the case of assuming regions to be irradiated that are apart from the light emission surfaces of light emitting elements 120 by 1000 mm. Vertical axes and lateral axes in the left diagrams of FIGS. 9A and 9B represent distances (mm) from optical axes LA of light emitting elements 120 (central axes CA of light flux controlling members 140 and 140'). Vertical axes in the right diagrams represent illuminances (lux).

As illustrated in FIGS. 9A and 9B, the light emitting devices having light flux controlling members 140 and 140' in which convex parts 146 are disposed along sides (first virtual straight lines L1) of virtual quadrangles S can illuminate the regions to be irradiated in a quadrangular shape (a rectangular shape). Irrespective of presence or absence of wall portions 147, the shapes of the regions to be irradiated were quadrangles (rectangles), and illuminances were substantially uniform. Thereby, it has been found out that by adapting the shape of the virtual n-sided polygon to the shape of the region to be irradiated, the region to be irradiated in a polygonal shape can be properly illuminated. Further, it has been found out that wall portions 147 do not affect the light distribution characteristics of light flux controlling member 140.

(Configuration of Illumination Apparatus)

Next, illumination apparatus 400 having light emitting device 100 according to the present embodiment will be described.

Figure 10:
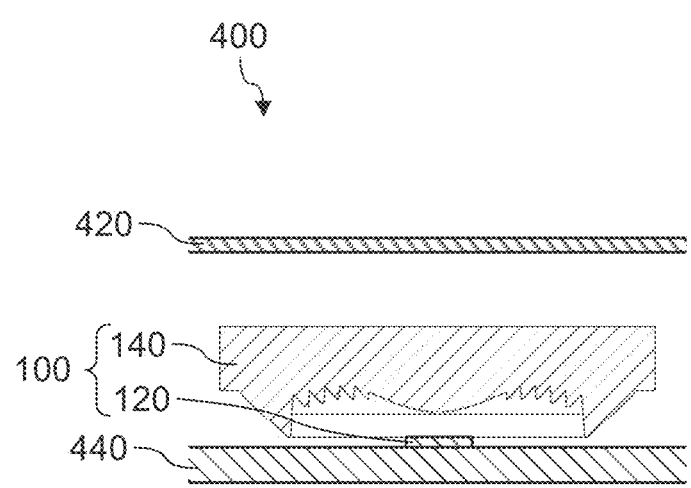
FIG. 10 illustrates a configuration of an illumination apparatus according to Embodiment 1.

FIG. 10 illustrates a configuration of illumination apparatus 400 according to Embodiment 1. As illustrated in FIG. 10, illumination apparatus 400 may have a, plurality of light emitting devices 100 and covers 420. As described above, light emitting device 100 includes light flux controlling member 140 and light emitting element 120. Light emitting element 120 is fixed to substrate 440.

Cover 420 transmits emitted light from light emitting device 100 while diffusing the emitted light, and protects light emitting device 100. Cover 420 is disposed on an optical path of the light to be emitted from light emitting device 100. The material of cover 420 is not particularly limited as long as the above described function can be exhibited. The material of cover 420 is an optically transparent resin such as polymethyl methacrylate (PMMA), polycarbonate (PC) and an epoxy resin (EP), or glass.

(Effect)

As described above, light flux controlling member 140 according to Embodiment 1 adopts virtual quadrangle S as a virtual n-sided polygon, and thereby can uniformly and efficiently illuminate the quadrangular region to be irradiated. Light flux controlling member 140 according to Embodiment 1 can be properly formed because gas is properly drained through the portions corresponding to wall portions 147 of the molding die at the time of injection molding. Further, in light flux controlling member 140, both the end portions of convex parts 146 are protected by wall portions 147, and therefore, both the end portions of convex parts 146 will not be broken after molding.

Note that as described above, the virtual n-sided polygon (quadrangle) that is assumed to be incidence region 141 can be designed in accordance with the shape of the region to be irradiated. For example, when the shape of the region to be irradiated is a triangle, the virtual n-sided polygon can be made as a virtual triangle, and when the shape of the region to be irradiated is a pentagon, the virtual n-sided polygon can be made as a virtual pentagon. In this case, a plurality of n-sided polygons can be disposed in such a manner that a plurality of virtual n-sided polygons of different sizes surround central axis CA of the light flux controlling member, and can have the same number of apexes. The respective virtual n-sided polygons are disposed so as not to intersect sides of the other virtual n-sided polygons. When a plurality of virtual quadrangles are assumed as the virtual n-sided polygons, a certain virtual quadrangle may be a square, and the other virtual quadrangles may be rectangles, parallelograms and the like.

As described above, convex part 146 is disposed in such a manner that ridge line 146d is along a line connecting the adjacent two apexes of the virtual n-sided polygon. In the present embodiment, the line that connects the two adjacent apexes of the virtual n-sided polygon is a straight line (first virtual straight line L1), but the line that connects the two adjacent apexes of the virtual n-sided polygon may be a curved line (first virtual curved line). In this case, ridge line 146d of convex part 146 is also a curved line.

When the virtual n-sided polygon is a regular polygon (square) as in the present embodiment, a plurality of virtual regular polygons of different sizes can be disposed to surround a "center" of the smallest regular polygon. When the virtual n-sided polygon is a polygon in which the center cannot be defined, the virtual n-sided polygon can be disposed to surround a "centroid" of the smallest polygon, for example.

The planar shape of light emitting element 120 is not specially limited. Examples of the planar shape of light emitting element 120 include circle, and polygon such as quadrangle. For example, in the case of light emitting element 120 in a quadrangle, the positional relation of one side of light emitting element 120 and one side of the virtual polygon of light flux controlling member 140 is not specially limited.

(Embodiment 2)

(Configuration of Light Flux Controlling Member)

A light emitting device and an illumination apparatus according to Embodiment 2 differ from light emitting device 100 and illumination apparatus 400 according to Embodiment 1 in the configuration of Fresnel lens section 245 of light flux controlling member 240. Therefore, the same components as the components of light emitting device 100 and illumination apparatus 400 according to Embodiment 1 will be assigned the same reference signs, and explanation thereof will be omitted.

Figure 11:
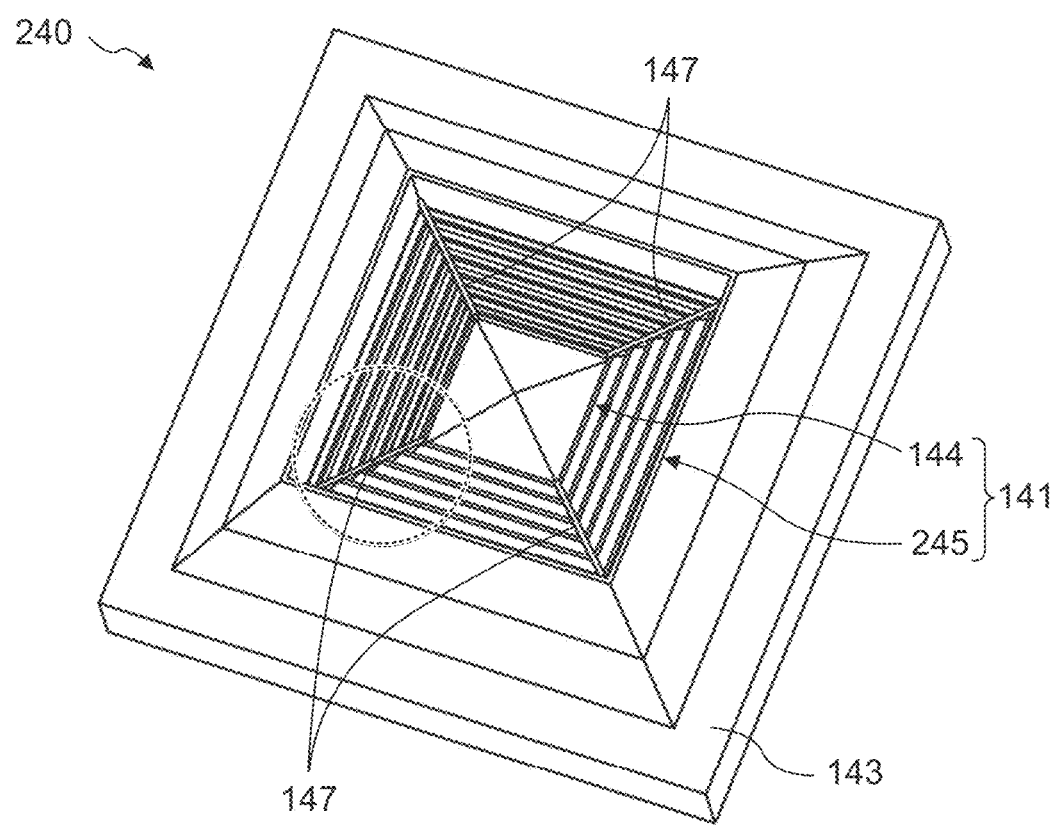
FIG. 11 is a perspective view of a light flux controlling member according to Embodiment 2.
Figure 14:
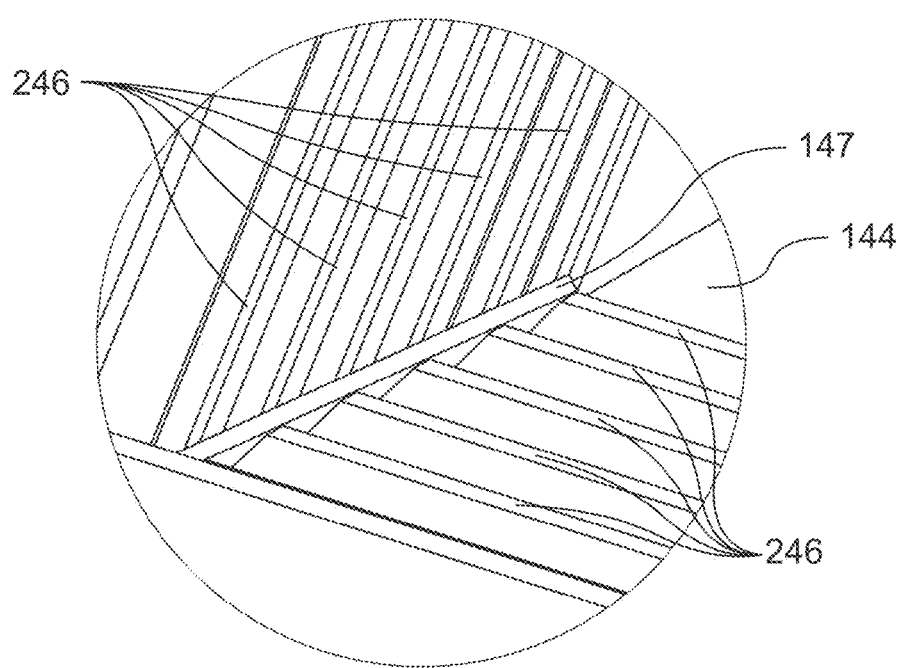
FIG. 14 is a partially enlarged view of the light flux controlling member according to Embodiment 2.

FIGS. 11 to 14 illustrate a configuration of light flux controlling member 240 according to Embodiment 2. FIG. 11 is a perspective view of light flux controlling member 240. FIG. 12A is a bottom view of light flux controlling member 240. FIG. 12B is a bottom view schematically illustrating only ridge lines 246d of convex parts 246. FIG. 13A is a sectional view taken along the line C-C illustrated in FIG. 12A. FIG. 13B is a sectional view taken along the line D-D. FIG. 13C is an enlarged view of the portion indicated by the broken line in FIG. 13B. FIG. 14 is an enlarged view of the portion indicated by the broken line in FIG. 11.

As illustrated in FIGS. 11 to 14, Fresnel lens section 245 of light flux controlling member 240 has a plurality of convex parts 246 and a plurality of wall portions 147.

Wall portions 147 are provided to extend toward a central portion (central axis CA) from four apexes of virtual square (a virtual n-sided polygon) S in plan view. Convex part 246 is disposed in a region between adjacent wall portions 147 to connect adjacent wall portions 147. In each region, a plurality of convex parts 246 are disposed, and a valley portion is formed between convex parts 246. Wall portion 147 is disposed along a line (second virtual straight line L2; line overlapping a diagonal line) that connects corresponding apexes of a plurality of virtual squares (virtual n-sided polygon) S. At this time, wall portion 147 does not have to be disposed over the entire length of the diagonal line.

Figure 12A:
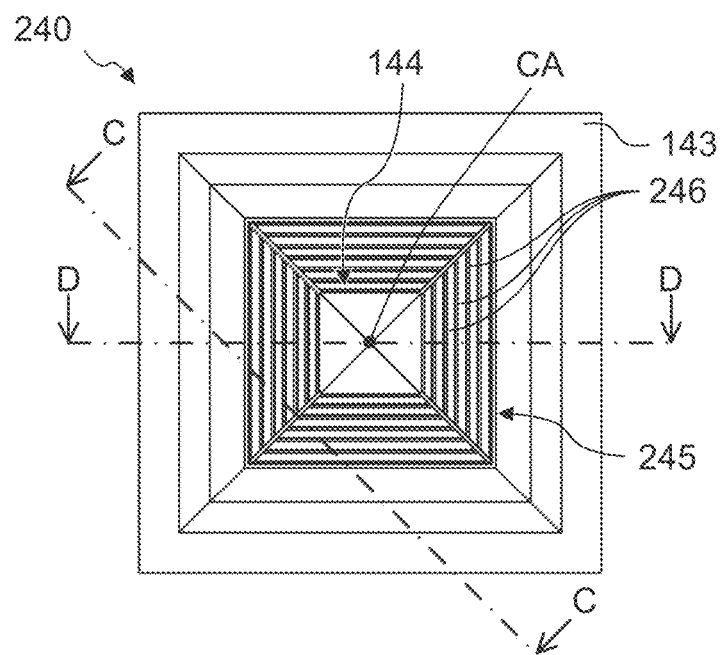
FIGS. 12A and 12B are bottom views of the light flux controlling member according to Embodiment 2.
Figure 12B:
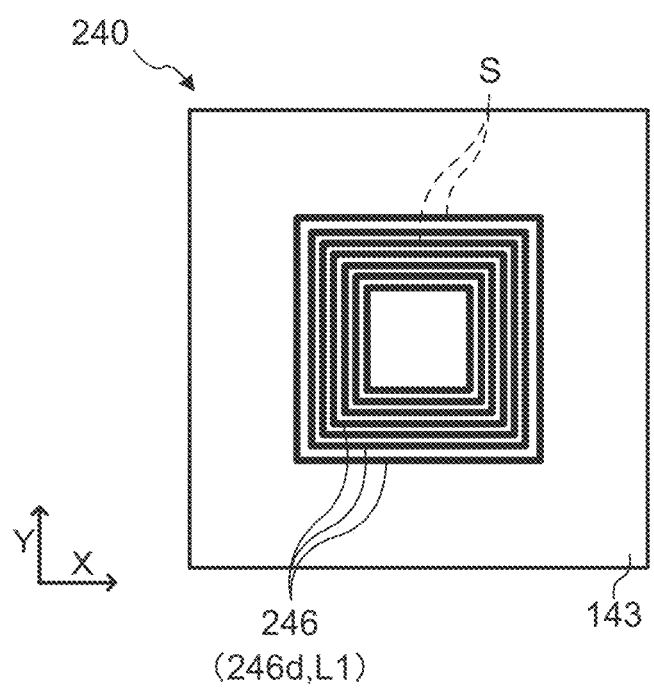
Figure 13A:
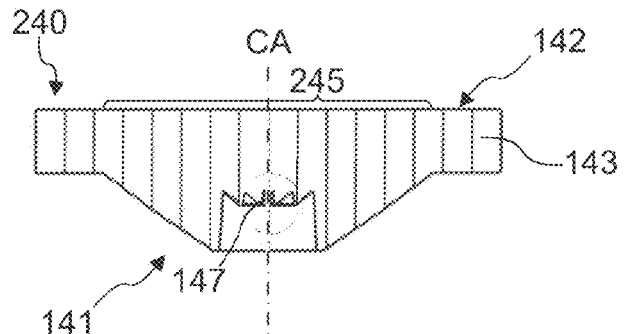
FIGS. 13A to 13C are sectional views of the light flux controlling member according to Embodiment 2.
Figure 13B:
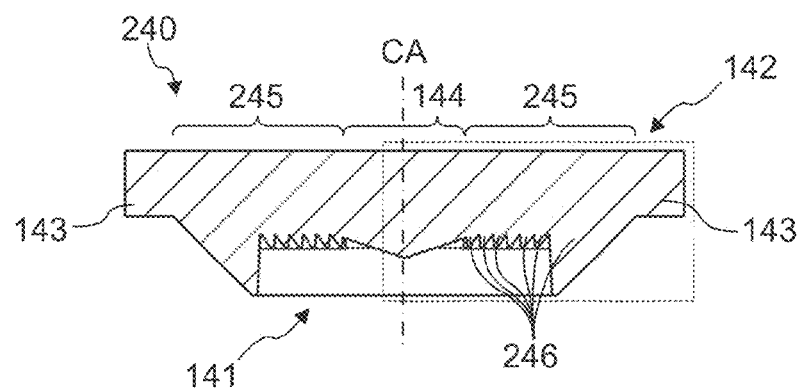
Figure 13C:
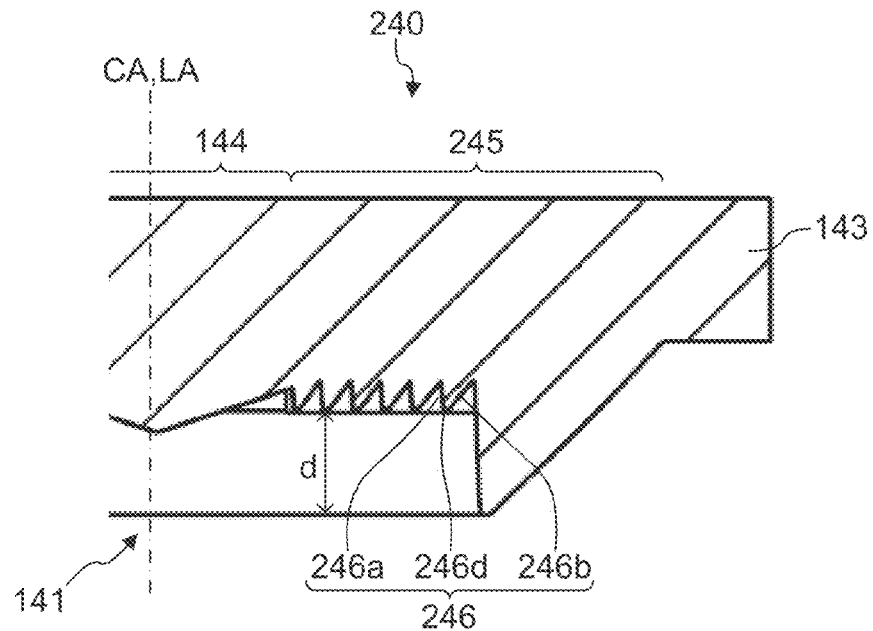

As illustrated in FIG. 12B, a pitch between ridge lines 246d of convex parts 246 in the X-axis direction is the same as a pitch between ridge lines 246d of convex parts 246 in the Y-axis direction. Further, convex part 246 that is located at an outermost side is formed to be larger than convex parts 246 that are located at an inner side.

Convex part 246 does not have third inclining surface 146c in Embodiment 1. Accordingly, ridge line 246d is a boundary line of first inclining surface 246a and second inclining surface 246b.

Wall portion 147 is disposed continuously between convex parts 246 except for convex parts 246 that are located at the innermost side in second virtual straight line L2 in plan view and convex parts 246 that are located at the outermost side. In the present embodiment, an inward end portion of wall portion 147 is not extended to refraction section 144, but may be extended to refraction section 144.

(Illuminance Simulation)

For the light emitting device having light flux controlling member 240 including wall portions 147 according to Embodiment 2, simulation of illuminance distribution was performed.

Figure 15:
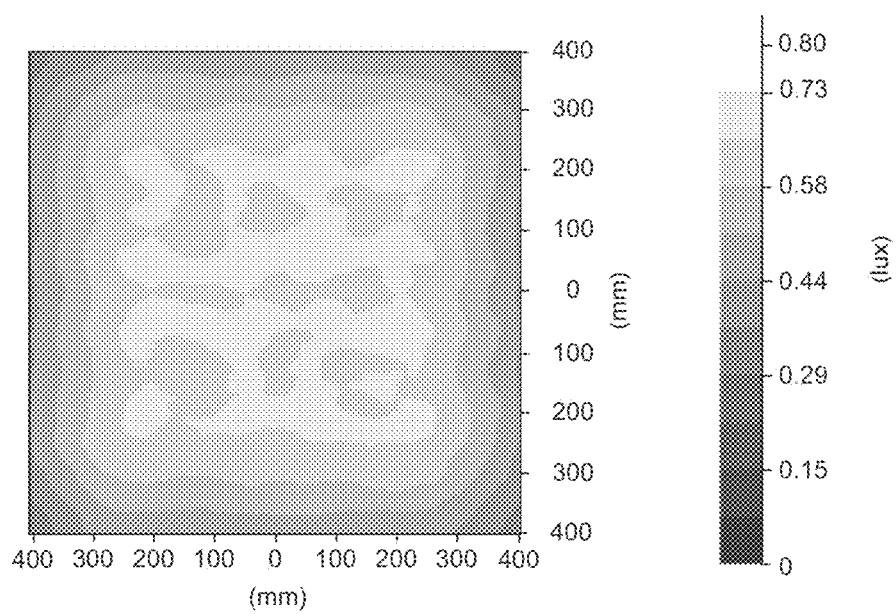
FIG. 15 is a diagram illustrating a simulation of illuminance distribution.

FIG. 15 is a diagram illustrating a simulation of illuminance distribution using the light emitting device according to the present embodiment. FIG. 15 is a diagram illustrating the simulation of the illuminance distribution in the case of assuming a region to be irradiated that is apart from an emission surface of light emitting element 120 by 1000 mm, and the vertical axis and the lateral axis in the left diagram of FIG. 15 represent distances (mm) from optical axis LA (central axis CA of light flux controlling member 240) of light emitting element 120. Further, the vertical axis in the right diagram represents illuminance (lux).

As illustrated in FIG. 15, in the light emitting device having light flux controlling member 240 according to the present embodiment, the virtual n-sided polygon is virtual square S, and therefore, the region to be irradiated can be illuminated in a square shape. Further, the illuminance in the region to be irradiated was substantially uniform. Thereby, it has been found out that by adapting the shape of the virtual n-sided polygon to the shape of the region to be irradiated, the region to be irradiated in a polygon can be properly illuminated. Further, light flux controlling member 240 according to Embodiment 2 can be properly formed because gas is appropriately drained through the portions corresponding to wall portions 147 of the molding die at the time of injection molding. Furthermore, in light flux controlling member 240, both the end portions of convex parts 246 are protected by wall portions 147, and therefore, both the end portions of convex parts 246 will not be broken after molding.

(Effect)

As described above, light flux controlling member 240 according to Embodiment 2 has a similar effect to the effect of light flux controlling member 140 of Embodiment 1.

(Embodiment 3)

(Configuration of Light Flux Controlling Member)

A light emitting device and an illumination apparatus according to Embodiment 3 respectively differ from light emitting device 100 and illumination apparatus 400 according to Embodiment 1 in the configuration of Fresnel lens section 345 of light flux controlling member 340. Therefore, the same components as the components of light emitting device 100 and illumination apparatus 400 according to Embodiment 1 will be assigned the same reference signs, and explanation thereof will be omitted.

Figure 16:
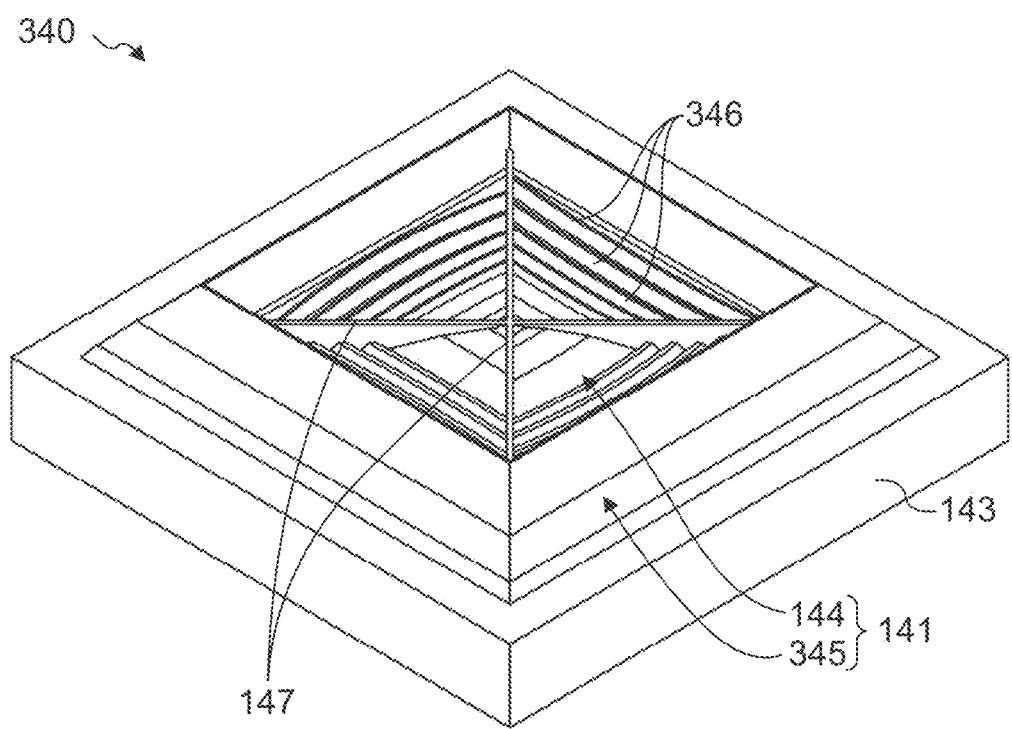
FIG. 16 is a perspective view of a light flux controlling member according to Embodiment 3.
Figure 17A:
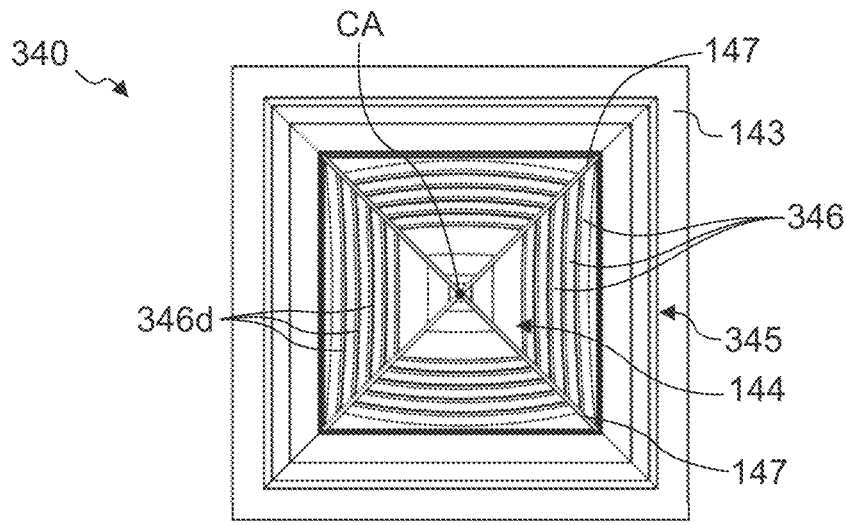
FIGS. 17A to 17C illustrate a configuration of the light flux controlling member according to Embodiment 3.
Figure 17B:
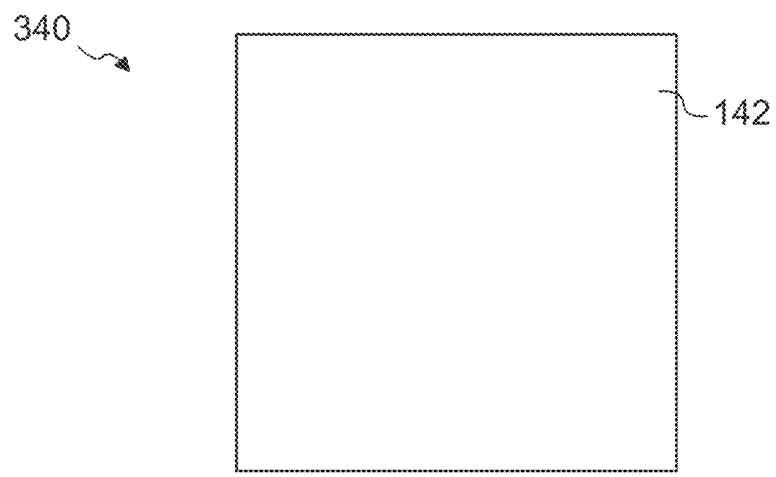
Figure 17C:
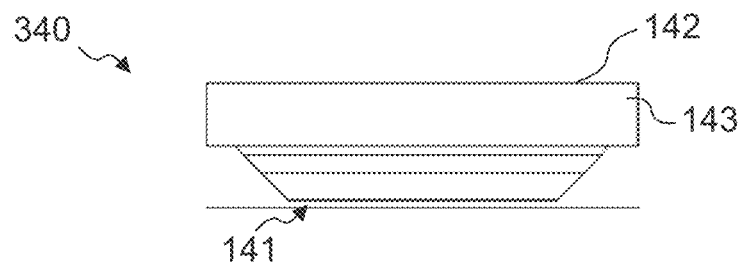

FIGS. 16 and 17A to 17C illustrate a configuration of light flux controlling member 340 according to Embodiment 3. FIG. 16 is a perspective view of light flux controlling member 340. FIG. 17A is a bottom view of light flux controlling member 340. FIG. 17B is a plan view of light flux controlling member 340. FIG. 17C is a side view of light flux controlling member 340.

As illustrated in FIG. 16 and FIGS. 17A to 17C, Fresnel lens section 345 of light flux controlling member 340 according to Embodiment 3 has a plurality of convex parts 346 and a plurality of wall portions 147.

Wall portions 147 are provided to extend to a central portion (central axis CA) from four apexes of virtual square (virtual n-sided polygon) S in plan view.

A plurality of convex parts 346 are disposed to connect adjacent wall portions 147, in four regions among adjacent wall portions 147. In the present embodiment, in order to control all of the light that is emitted at a large angle with respect to optical axis LA by light flux controlling member 340, convex parts 346 that are located at an outermost side are formed to be larger than convex parts 346 that are located at an inner side (central axis CA side). Note that in the present embodiment, a plurality of convex parts 346 that are located at the inner side of light flux controlling member 340 are formed at the same pitches. The present invention is not limited thereto, and the pitches, vertical angles and heights of a plurality of convex parts 346 at the inner side may be formed to differ from one another, and design with a high degree of freedom is enabled in accordance with the light flux control performance to be required.

The shape in plan view of convex part 346 that is located at the outermost side is linear, and the shapes in plan view of a plurality of convex parts 346 that are located at the inner side (central axis CA side) are circular-arc shapes. The radius of curvature of the circular arc (ridge line 346*d*) is longer than a distance to a middle point of ridge line 346*d* from an intersection point of diagonal lines of virtual square S. The radius of curvature of the circular arc is not specially limited as long as the above described conditions can be satisfied. By adjusting the radius of curvature of the circular arc, a difference between light distribution characteristics in directions along the sides of virtual square S, and light distribution characteristics in directions along diagonal lines of virtual square S can be adjusted. For example, when the radius of curvature of the circular arc is large (when ridge line 346*d* is close to a straight line), the irradiated region by the light emitted from light flux controlling member 340 becomes quadrangular.

In a pair of regions (regions at the right side and the left side in FIG. 17A) that face each other with central axis CA therebetween, out of the aforementioned four regions, ridge lines 346*d* are disposed to protrude to central axis CA side in plan view. In this case, the center of curvature of the circular arc (ridge line 346*d*) is disposed on the straight line that passes through a center (the intersection point of the diagonal lines) of virtual square S and the middle point of one side of virtual square S and outside from convex part 346 at the outermost side.

Further, in the other pair of regions (regions at the upper side and the lower side in FIG. 17A) that face each other with central axis CA therebetween, ridge lines 346*d* are disposed to protrude outward in plan view. In this case, the center of curvature of the circular arc (ridge line 346*d*) is disposed on the straight line that passes through a center (the intersection point of the diagonal lines) of virtual square S and the middle point of one side of virtual square S and at a position which is at a longer distance from the circular arc than the center of virtual square S.

Since between the pair of regions that face each other with central axis CA therebetween, and the other pair of regions, the shapes of ridge lines 346*d* (convex parts 346) differ from each other as described above, displacements also arise among convex parts 346 on second virtual straight line L2, and edge portions 148 are also produced in the present embodiment. Therefore, in light flux controlling member 340 in the present embodiment, opposite end portions of convex parts 346 are also protected by wall portions 147. Accordingly, in light flux controlling member 340 according to the present embodiment, both the end portions of convex parts 346 will not be broken, and desired light distribution characteristics can be obtained.

(Illuminance Simulation)

For the light emitting device having light flux controlling member 340 according to Embodiment 3, simulation of illuminance distribution was performed.

Figure 18:
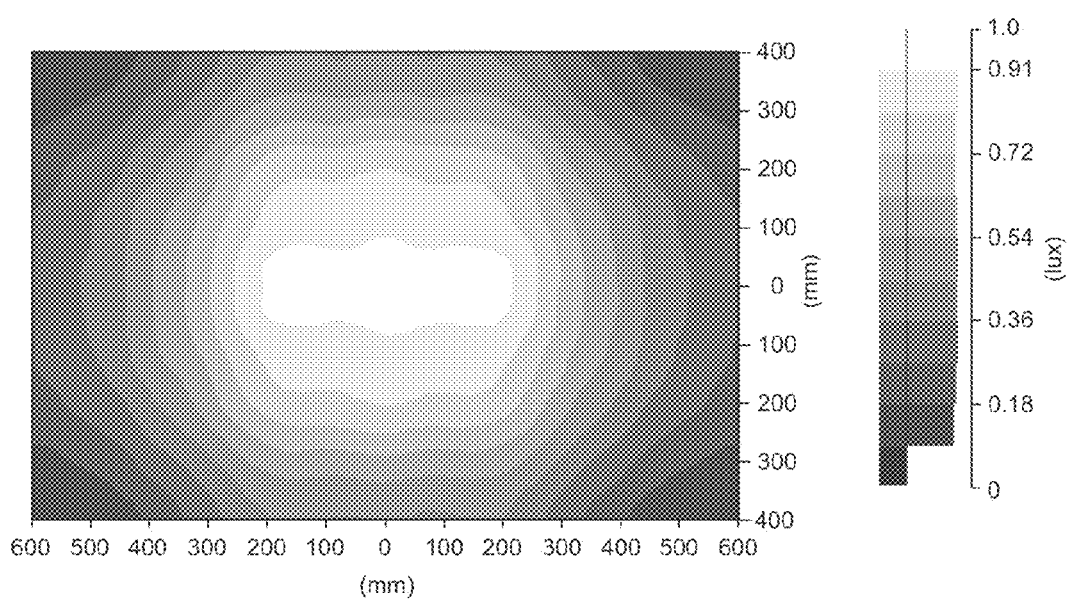
FIG. 18 is a diagram illustrating a simulation of illuminance distribution.

FIG. 18 is a diagram illustrating a simulation of the illuminance distribution using the light emitting device having light flux controlling member 340 according to Embodiment 3. FIG. 18 is the simulation of the illuminance distribution in the case of assuming the region to be irradiated that is apart from the light emission surface of light emitting element 120 by 1000 mm, and the vertical axis and the lateral axis in the left diagram of FIG. 18 represent distances (mm) from optical axis LA of light emitting element 120 (central axis CA of light flux controlling member 340). The vertical axis in the right diagram represents illuminance (lux).

As illustrated in FIG. 18, the light emitting device having light flux controlling member 340 according to Embodiment 3 can illuminate the region to be irradiated in a rectangular shape in spite that virtual quadrangle S is a square, because the shapes of ridge lines 346*d* differ in accordance with the regions. Further, though not specially illustrated, the shape of the region to be irradiated was rectangular and the luminance was substantially uniform, irrespective of presence or absence of wall portions 147. Thereby, it has been found out that wall portion 147 does not affect the light distribution characteristics of light flux controlling member 340.

(Effect)

Light flux controlling member 340 according to Embodiment 3 has a similar effect to the effects of light flux controlling members 140 and 240 according to Embodiment 1 and Embodiment 2.

Note that the combination of the shapes in plan view of ridge lines 346d in the aforementioned four regions does not have to be the aforementioned combination. For example, the ridge lines 346d may be disposed in such a manner that the shapes in plan view of all of ridge lines 346d protrude outward, or the ridge lines 346d may be disposed in such a manner that the shapes in plan view of all of ridge lines 346d protrude to the central axis CA side. Further, ridge lines 346d may be disposed in such a manner that ridge lines 346d disposed in adjacent two regions protrude inward, and ridge lines 346d may be disposed in such a manner that ridge lines 346d disposed in the other two adjacent regions protrude outward.

Industrial Applicability

The light flux controlling member, the light emitting device and the illumination apparatus according to the present invention can uniformly and efficiently illuminate a polygonal region to be irradiated. The light emitting device according to the present invention is useful as a flash of a camera and the like, for example. Further, the illumination apparatus according to the present invention is useful as an ordinary indoor lighting, a surface light source apparatus which surface to be irradiated is a liquid crystal panel and the like, for example.

REFERENCE SIGNS LIST 10, 100 Light emitting device
20, 440 Substrate
21 Light source substrate
30 Light source
40 Fresnel lens
41 Refraction Fresnel lens section
42 Reflection Fresnel lens section
43, 141 Incidence region
44, 142 Emission region
45 Incidence surface
46 Emission surface
120 Light emitting element
140, 140', 240, 340 Light flux controlling member
143 Flange
144 Refraction section
145, 245, 345 Fresnel lens section
146, 246, 346 Convex part
146a, 246a First inclining surface
146b, 246b Second inclining surface
146c Third inclining surface
146d, 246d, 346d Ridge line
147 Wall portion
147a Apex
147b Side surface portion
148 Edge portion
400 Illumination apparatus
420 Cover
CA Central axis
LA Optical axis
S Virtual quadrangle, Virtual square

The invention claimed is:

1. A light flux controlling member that controls distribution of light that is emitted from a light emitting element, comprising:
an incidence region that allows the light that is emitted from the light emitting element to be incident thereon; and
an emission region that emits light that is incident on the incidence region,
wherein the incidence region includes n wall portions that are provided to extend to a central portion from respective n apexes of a virtual n-sided polygonal shape, and a plurality of convex parts each of which has a ridge line that connects two of the wall portions adjacent to each other,
the plurality of convex parts are each disposed in such a manner that a valley portion is formed between two of the convex parts adjacent to each other,
the wall portion is disposed continuously at least between a connection portion of the convex parts located at an innermost side and a connection portion of the convex parts located at an outermost side, and
the ridge line is connected to an apex of the wall portion, or a side surface portion of the wall portion.

2. The light flux controlling member according to claim 1, wherein the ridge line is a straight line.

3. The light flux controlling member according to claim 2, wherein the plurality of convex parts each of which connects two of the wall portions adjacent to each other are disposed in such a manner that the respective ridge lines are parallel with one another.

4. The light flux controlling member according to claim 1, wherein the virtual n-sided polygonal shape is rotationally symmetrical.

5. The light flux controlling member according to claim 1, wherein the convex part is disposed between every two of the wall portions that are adjacent to each other.

6. A light emitting device, comprising:
a light emitting element; and
the light flux controlling member according to claim 1.

7. An illumination apparatus, comprising:
the light emitting device according to claim 6; and
a cover that transmits emitted light from the light emitting device while diffusing the emitted light.

* * * * *